United States Patent [19]

Sturmon

[11] Patent Number: 5,050,549
[45] Date of Patent: Sep. 24, 1991

[54] METHOD OF CLEANING INTERNAL COMBUSTION ENGINE COOLING SYSTEM AND FILTER FOR USE THEREIN

[76] Inventor: George R. Sturmon, 608 Indian Hills Dr., St. Charles, Mo. 63301

[21] Appl. No.: 538,220

[22] Filed: Jun. 14, 1990

[51] Int. Cl.[5] ............................................. F02B 77/00
[52] U.S. Cl. ................................ 123/198 E; 210/209; 134/22.14
[58] Field of Search ................. 123/198 E; 134/2, 40, 134/22.11, 22.12, 22.13, 22.14, 169 A; 210/209, 696, 767, 74, 75, 76

[56] References Cited

U.S. PATENT DOCUMENTS

| | | | |
|---|---|---|---|
| 2,802,788 | 8/1957 | Flaxman et al. | 252/105 |
| 3,147,223 | 9/1964 | Boies et al. | 252/75 |
| 3,348,693 | 10/1967 | Cornell | 210/282 |
| 3,540,528 | 11/1970 | Moon | 210/167 |
| 3,645,402 | 2/1972 | Alexander et al. | 210/266 |
| 3,948,792 | 4/1976 | Watsen et al. | 252/181 |
| 3,962,109 | 6/1976 | Oberhofer et al. | 252/74 |
| 4,242,214 | 12/1980 | Lambert, Jr. | 252/75 |
| 4,279,768 | 7/1981 | Busch | 252/180 |
| 4,404,113 | 9/1983 | Peters et al. | 252/71 |
| 4,540,443 | 9/1985 | Barber | 134/2 |
| 4,587,028 | 5/1986 | Darden | 252/75 |
| 4,707,286 | 11/1987 | Carr | 252/75 |
| 4,711,735 | 12/1987 | Gulley | 252/75 |
| 4,717,495 | 1/1988 | Hercamp et al. | 252/75 |
| 4,744,949 | 5/1988 | Hoots et al. | 422/15 |
| 4,842,731 | 6/1989 | Dobrez et al. | 210/209 |

OTHER PUBLICATIONS

Questions & Answers, Nalcool ® 3000 With Stabil-Aid Nalco Chemical Chemical Company, 1985.
Case Study Nalcool Need Release ® Nalco Chemical Company, 1990.
Material Safety, Data Sheet Nalprep 2001 Engine Cleaner, Nalco Chemical Company, 1988.
Nalprep 2001 Engine Cooling System Cleaner, Nalco Chemical Company 1984.
Introducing Fleetguard "Restore" Heavy Duty Cooling System Cleaner pp. 113-140.
Fleetguard ® Restore, Bulletin 8105, Fleetwood Inc.
Nalcool ® 3000 Cooling System Filter Nalco Chemical Company.

Primary Examiner—Noah P. Kamen
Attorney, Agent, or Firm—Polster, Polster & Lucchesi

[57] ABSTRACT

A method for cleaning and protecting a diesel cooling system from corrosion and the effects of the corrosive by-products wherein a filter is used to feed a dissolvable pellet comprising dissolvable cleaning agents and corrosion inhibiting agents into the cooling system. The cleaner consists of chelating agents, surfactants, and anti-foaming agents. The filter is removably inserted in the cooling system, and the cleaners and inhibitors dissolve in the coolant to clean and protectively coat the cooling system while the engine is operating. The removed impurities are captured by the filter and the filter is replaced within a few weeks with a standard filter containing inhibiting agents. The method thus does not require draining the cooling system to clean the cooling system.

20 Claims, 1 Drawing Sheet

1

METHOD OF CLEANING INTERNAL COMBUSTION ENGINE COOLING SYSTEM AND FILTER FOR USE THEREIN

BACKGROUND OF THE INVENTION

This invention relates to a method of cleaning the cooling system of an internal engine and more specifically to a method of cleaning the cooling system of a diesel engine for both on-road and off-road vehicles.

Diesel engines for vehicles typically operate at high temperatures. At these elevated temperatures, unstable silicates and phosphates in the anti-freeze (typically an alcohol, usually an aqueous ethylene glycol solution with various additives) combine with the hard water and corrosion products in the cooling system to form a gel. This gel may consist of calcium silicates, calcium phosphates, and magnesium silicate. The gel will eventually restrict the flow of coolant through the cooling system and result in an inability to properly cool the engine or heat the cab of a car or truck. It will also cause hot spots within the engine. Both the overall overheating and the localized heating lead to such problems as increased oil temperatures, premature water pump failure, scuffed cylinder liners, and cracked or warped heads. The engines are also subject to the build-up of scale, rust, corrosion products, and the like, which not only cause their own problems such as sticking thermostats and failed water pump seals, but interact physically and chemically with each other and the gel to exacerbate the problems.

Presently, to effectively clean a diesel cooling system, the system must be treated by draining and flushing the engine to remove loose contaminants, then mixing and adding a liquid cleaning agent, running it through the engine for three to four weeks, then draining and flushing the cooling system to remove the loosened particles and then filling it again with coolant. Such cleaning liquids include products sold under the trademark Restore, which is manufactured by Fleetguard, Inc., and Nalprep 2001, which is manufactured by Nalco Chemical Company. These products must be diluted before they are added to the system, to prevent localized damage to the system. Such a method of cleaning is both complicated and expensive, in that it requires considerable labor and requires substantial vehicle downtime Therefore, it is not uncommon for diesel engine cooling systems to go for long periods without cleaning. It has been estimated that more than half of all diesel engine failures are directly attributable to cooling system problems.

Formulations for cooling system cleaners are widely known. The best cleaners for general purpose cleaning are known as inhibited alkaline chelant cleaners; both Nalco's Nalprep 2001 and Fleetguard's Restore are of this type. They include a chelating agent, such as a polycarboxylic acid salt of an amine (for example, an alkaline salt of nitrilotriacetic acid or, preferably, one of the alkaline salts of ethylenediaminetetraacetic acid (EDTA)), one or more corrosion inhibitors to prevent the cleaned surfaces from immediately corroding again, and a buffer to maintain an alkaline pH. The patent literature describes a number of such cleaners, including U.S. Pat. Nos. 2,802,788 (Flaxman), 3,962,109 (Oberhofer et al), 4,279,768 (Busch), and 4,540,443 (Barber).

Once the cooling system has been cleaned, it must immediately be protected against further corrosion and contamination by the addition of a chemical inhibitor mixture. These inhibitors, however, do not dissolve corrosion products or gel which have already formed. Thus, adding such chemical inhibitors to a dirty or corroded cooling system may do further damage to the system, as by causing scale or corrosion to break off in chunks. Such inhibitor mixtures generally include compounds for inhibiting corrosion of the materials encountered by the coolant, such as ferrous metals, aluminum, and red metals such as brass, bronze and copper, as well as such additional chemicals as defoamers, surfactants, pH controllers, and indicators. Generally, such inhibitor mixtures include chemicals (alkaline buffers) to maintain the pH of the coolant above 7. Examples of such inhibitor mixtures are well known, and are described, for example in U.S. Pat. Nos. 3,147,223 (Boies et al), 3,948,792 (Watson et al), 4,242,214 (Lambert), 4,404,113 (Peters et al), 4,587,028 (Darden), 4,707,286 (Carr), 4,711,735 (Gulley), 4,717,495 (Hercamp et al), and 4,744,949 (Hoots et al).

The cooling system of a typical diesel engine differs from that of other typical internal combustion engines in that it includes a filter for removing loose debris from the circulating coolant. The coolant filter is a by-pass filter, which typically sees all of the coolant in the system over a period of about sixteen to twenty cycles of the water through the system.

Rather than add inhibitor mixtures to the coolant system directly as concentrated solutions, they are frequently added to the system by enclosing them in the coolant filter A commercially available filter of this type is sold by Nalco Chemical Company as its Nalcool 3000 cooling system filter. A recently introduced version of this filter, sold under the trademark Nalcool Need-Release and described in bulletin TT-108, includes membranes which release a solid pelletized inhibitor as needed over a period of up to one year or 100,000 miles. The patent literature also describes such filters containing an inhibitor package. Examples are U.S. Pat. Nos. 3,348,693 (Cornell), 3,645,402 (Alexander et al), and 4,842,731 (Dobrez et al). As previously noted, the use of such filter/inhibitor packages with a dirty engine may be worse than adding no inhibitors.

SUMMARY OF THE INVENTION

One of the objects of the present invention is to provide a simple, inexpensive, and highly effective method for cleaning the cooling system of an internal combustion engine, particularly a diesel engine.

Another object is to provide such a method which will continuously clean the cooling system of an internal combustion engine while protecting it from corrosion products and gels.

Another object is to provide such a method which does not require downtime of the vehicle.

Other objects of this invention will be apparent to those skilled in the art in light of the following description and accompanying drawings.

In accordance with one aspect of the present invention, generally stated, a method is provided for cleaning gel and corrosion products from a cooling system of an internal combustion engine, the method comprising attaching into the cooling system a filter containing at least one cleaning agent, and operating the engine to disperse the cleaning agent throughout the cooling system to remove corrosion products and gel from the system.

Preferably, the cleaning agent is incorporated in the filter in a manner to enter the coolant slowly enough to form a generally homogeneous mixture of the cleaning agent throughout the entire volume of coolant in the system. Therefore, localized damage to the system is prevented, while permitting sufficient cleaning agent to be added to provide extremely effective cleaning. Preferably, the cleaning agent is in the form of one or more pellets, whose composition and surface area are chosen to provide the desired dissolution period. The pellet or pellets dissolve in the coolant, typically, in a period of several minutes to several hours, most preferably in a period of at least ten minutes when the engine is running. If the distribution of the cleaning agent into the cooling system is spread out over a period of time, as by enclosing it in one or more slowly dissolving containers or capsules, the cleaner may also be granular or liquid, although the use of a liquid cleaning agent is not preferred because of the greatly increased activity of the cleaning composition when it is wet.

In the preferred embodiment of the method, the filter containing the cleaning agent is removed after a period of from one week to two months, and a filter containing one or more inhibitors is substituted, the second filter containing agents to control the pH of the coolant at a level to keep contaminants in solution or suspension, without flushing the cooling system. The system thereby provides cleaning and protection of the cooling system without requiring it to be flushed or drained.

In the preferred method, the cleaning agent is a chelating agent, preferably an alkaline chelant. The preferred chelants are alkaline salts of aminocarboxylic acids, such as the alkaline forms of ethylenediaminetetraacetic acid (EDTA) or, less desirably, of nitrilotriacetic acid (NTA). Other alkaline chelating agents are well known, the exact nature of the chelant not being essential to the invention. The solid pellets also include a buffer, such as a borate buffer, to maintain an alkaline pH, preferably in the range of 8 to 11, most preferably in the range of 9-10.

Preferably, the filter also contains such standard cleaner additives as a sequestering agent such as a liquid gluconate, a non-ionic surfactant, and an anti-foam compound The use of a liquid gluconate sequestering agent has the further advantage of providing a proper consistency for the dry, solid pellet.

Preferably, the filter also contains protective agents or inhibitors which are incorporated in the pellet or pellets The inhibitors coat the cleaned cooling system to prevent further corrosion. The protective agents may typically include an alkali metal metasilicate and an alkali metal nitrate corrosion inhibitor for aluminum, an alkali metal nitrite corrosion inhibitor for ferrous metals, and a benzoyl- or tolyltriazole corrosion inhibitor for red metals.

To provide proper cleaning of the engine cooling system, the chelant preferably constitutes at least twenty percent of the weight of the pellet, most preferably in the range of thirty to forty percent of its weight. Also preferably, the concentration of chelant in the circulating coolant is at least one-half part per thousand, by weight.

Using the preferred alkaline chelant cleaning agents, complete cleaning of the cooling system is accomplished in about three to four weeks. The cleaning filter is thereafter replaced by a standard inhibitor-loaded filter containing alkaline components and a buffer to maintain the pH of the coolant in the same alkaline range, thereby permitting the chelating agents in the coolant to continue to hold the dissolved contaminants, and permitting any residual free chelants to continue to scavenge any free gel or contaminants which may form. Such inhibitor-loaded filters now exist which will maintain the proper pH and the proper level of inhibitors for upwards of one year, an example being the Nalco "Nalcool" Need-Release filter mentioned previously. Therefore, the use of the present method can clean, and maintain clean, a diesel engine for upward of one year, by the simple attachment of two by-pass coolant filters, one a few weeks after the other.

The filter loaded with the cleaning agents itself forms another aspect of the invention.

Although not preferred, the filter may instead be loaded with inhibited acid cleaners, such as sulfamic acid or oxalic acid. If an acid is used, the cooling system must be flushed after a few hours, to prevent the acid from damaging the cooling system.

DESCRIPTION OF THE PREFERRED EMBODIMENT

Figure 1:
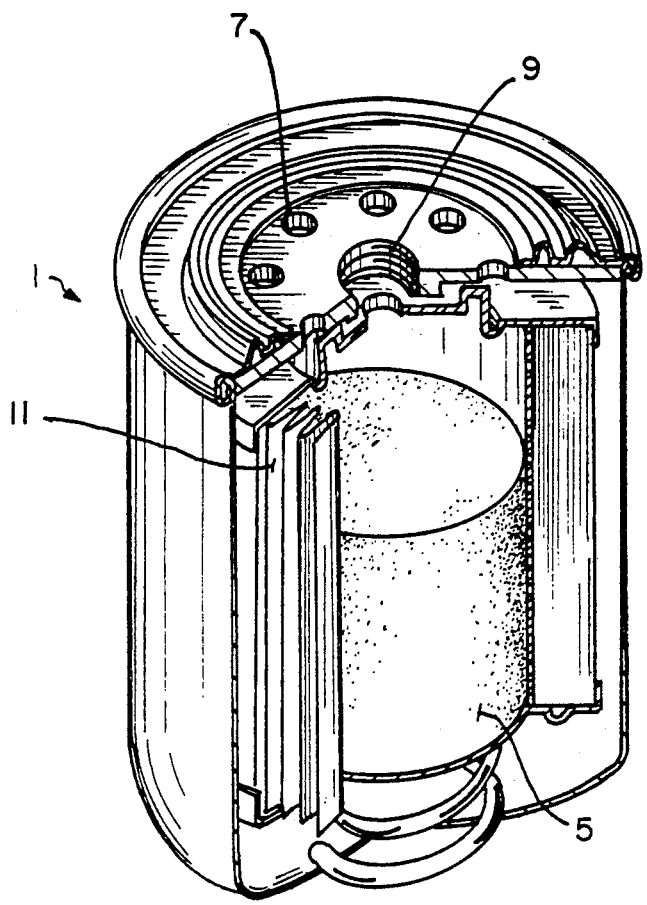
FIG. 1 is a view in perspective, partially cut away, of a filter of the present invention, for use in the method of the present invention.
Figure 2:
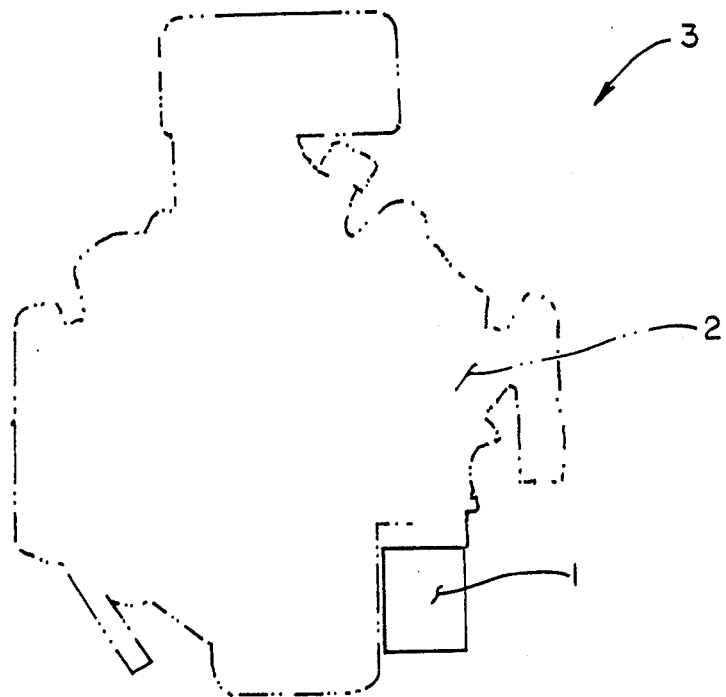
FIG. 2 is a schematic view of the filter of FIG. 1 installed in a cooling system of an internal combustion engine.

Referring to the Figures for one illustrative embodiment of filter for use in the method of the present invention, reference numeral 1 indicates a by-pass filter which is removably inserted into a coolant line 2 of an internal combustion engine 3 to be in fluid communication with the coolant line. The filter 1 is of a type commonly known in the art. The illustrative filter 1 is mechanically identical with a Nalcool 3000 filter sold commercially by Nalco Chemical Company, although it might also be of a type which is described in U.S. Pat. No. 3,348,693 (Cornell) or U.S. Pat. No. 3,540,528 (Moon). The filter 1 is used as a feeding system for introducing cleaning and inhibiting agents 5 into the cooling system. Briefly, the filter 1 includes an outer casing 6 having in its upper wall inlets 7 and an outlet 9, which is internally threaded to permit the filter to be "spun-on" to a fitting on the engine 3. Within the casing 6, a fluted paper filter 11 is carried by and between plates 12 and 13. A cylindrical perforated plate 14 inside the filter 11 acts as a spacer between the plates 12 and 13. A spring 15 between the casing 6 and the lower plate 13 pushes the upper plate 12 against the upper wall of the casing. The upper plate 12 divides the inlets 7 from the outlet 9, and forces circulating coolant to pass from the outside of the filter 11, through the perforated plate 14, and into a central chamber 4 before exiting the filter through outlet 9.

The interior space 4 of filter 1 contains a solid, dry pellet 5 of cleaning and inhibiting agents which are formed into the pellet 5 by mixing solid and liquid ingredients in a standard pelletizing machine. A binder may be used to help form the pellet but is not necessary in the preferred formulations as described hereinafter. The pellet or pellets may have any diameter or shape determined by the time-of-dissolution requirements of the method and the space available inside the filter.

The preferred cleaner is a non-ionic, low foam, inhibited alkaline chelant mixture. It preferably includes tetrasodium EDTA chelating agent, a liquid gluconate sequestering agent, and a non-ionic surfactant. The preferred pellet 5 also includes standard inhibitors, such as film-formers and other corrosion inhibitors for ferrous metals, aluminum, and red metals. It also may include buffers for maintaining the pH of the coolant in the range of 9 to 10. Examples of chemicals which may be included in an inhibitor package are sodium borate, sodium metasilicate, sodium nitrite, sodium nitrate, mercaptobenzothiazole (MBT), tolyltriazole (TT), surfactant, and anti-foam. Sodium salts are preferred as inhibiting agents, but potassium or other salts may also be used. An illustrative pellet 5 may have the following composition:

20-40% EDTA
10-25% liquid gluconate
10-25% non-ionic surfactant
5-10% sodium metasilicate
5-10% sodium nitrite
5-10% sodium nitrate
1-5% mercaptobenzothiazole
1-5% tolyltriazole
1-5% anti-foam All percentages are by weight. The anti-foam may, for example, be Dow A or Pluronic L-61. The inhibiting agents selectively protect the various metals from which the engine cooling system is made from corrosion. Sodium nitrite forms an oxide type film on ferrous metals. Sodium nitrate along with sodium metasilicate protects aluminum The nitrate prevents pitting. The silicate prevents other types of corrosion in aluminum. MBT and TT protect copper and brass by forming a thin coating thereon.

Typical diesel engine coolant systems have a volume of from five to thirty-two gallons. It has been found that the weight of the pellet 5 may be about six ounces to twenty-four ounces, for use in systems of different sizes throughout this range. For the great majority of systems, a pellet having a weight of about eight ounces has been found to be quite acceptable, although a larger, more heavily corroded or gelled system may require the use of more than one filter of the invention to provide complete cleaning as described hereinafter. It will be seen that this weight corresponds to a weight percent of EDTA in the system in the range of about 0.04% to about 1.0%.

In use, the filter 1 with the pellet 5 of cleaning and protecting agents within it is inserted in the coolant line 2 of the engine 3 in place of the standard filter. The placement of the filter in a typical diesel engine permits its replacement without draining the cooling system. During operation of the engine 3, the coolant heats and flows into the filter 1, and the pellet 5 dissolves over a period of about fifteen to forty-five minutes. The cleaning and inhibiting agents are dispersed throughout the cooling system. The cleaner acts to dissolve and remove scale, oil, gel, and corrosion products. Once removed they are transported in the coolant throughout the cooling system. Much of the suspended material is collected in the filter, and the remainder continues to circulate in chelated form, so long as the coolant remains alkaline. As the cleaner removes the impurities, corrosion products, and gel, the inhibitors protectively coat the cooling system to prevent further corrosion. After three or four weeks, the filter 1 is removed and a commercially available filter containing alkaline inhibiting agents and buffer is inserted in its place. So long as the commercially available filter is periodically replaced in accordance with the manufacturer's instructions, the cooling system does not need to be drained, flushed, or otherwise cleaned. After about a year, a new filter 1 is installed to clean the engine's cooling system again.

The life span of the first filters used in a cooling system, of course, may decrease depending upon the condition of the cooling system when the filter is first installed. If the cooling system is highly corroded and clogged with gels and other impurities, the first filter 1 used may have a shorter duration, and it may need to be replaced with a second filter 1.

Numerous variations, within the scope of the appended claims, will be apparent to those skilled in the art in light of the foregoing description and accompanying drawings. For example, other chelating agents as well as other sequestering agents, buffers, inhibitors, and additives may be added or substituted for those of the preferred embodiment, and certain of the components may be omitted, particularly if the filter is changed sooner. An inhibited acid, such as oxalic or sulfamic acid may be used in lieu of the chelating agent, but that approach requires removing the filter within a short time, and requires that the coolant be drained to remove dissolved impurities. In the preferred embodiment, a single pellet is formed to fit the cavity 4, but multiple round pellets, with a diameter of about one to two inches, could be used to provide a faster dissolution time. The pellets are sized to remain in the filter during transportation and installation. These variations are merely illustrative.

I claim:
1. A method for cleaning gel and corrosion products from a cooling system of an internal combustion engine, the method comprising attaching into the cooling system a filter containing at least one chelant cleaning agent, and operating the engine to disperse the cleaning agent throughout the cooling system to remove corrosion products and gel from the system, the amount of cleaning agent in the filter being chosen to produce a concentration of cleaning agent in the circulating coolant of at least one-half part per thousand, by weight.

2. The method of claim 1 wherein the cleaning agent enters the coolant slowly enough to form a generally homogeneous mixture of the cleaning agent throughout the entire volume of coolant in the system, thereby preventing localized damage to the system.

3. The method of claim 2 wherein the cleaning agent is in the form of one or more pellets, whose composition and surface area are chosen to provide the desired dissolution period.

4. The method of claim 3 wherein the pellet or pellets dissolve in the coolant in a period of from ten minutes to several hours.

5. The method of claim 1 wherein the cleaning agent includes a chelating agent and a material which maintains the coolant at an alkaline pH.

6. The method of claim 1, comprising a further step of capturing at least some of said removed gel and corrosion products in said filter.

7. The method of claim 6 wherein the cleaning agent is an alkaline salt of ethylenediaminetetraacetic acid.

8. The method of claim 1 including a further step of removing the filter and replacing it with a second filter containing one or more corrosion inhibitors, the second filter containing agents to control the pH of the coolant at a level to keep contaminants in solution or suspension, without draining or flushing the cooling system.

9. The method of claim 8 wherein the second filter is substituted for the first filter from one to five weeks after the first filter is attached into the cooling system.

10. The method of claim 1 wherein the first filter also contains a sequestering agent, the sequestering agent being dispersed throughout the cooling system with the cleaning agent.

11. The method of claim 1 wherein the first filter also contains a corrosion inhibiting agent, the corrosion inhibiting agent being dispersed throughout the cooling system with the cleaning agent to coat the cleaned cooling system to prevent further corrosion.

12. A filter for cleaning the cooling system of an internal combustion engine of gel and corrosion products which have formed therein, said filter comprising a cleaning agent for removing corrosion from the surfaces of said cooling system when said filter is connected into said cooling system, said cleaning agent being in a dry, solid form, said cleaning agent including with at least one ounce of a chelating agent to clean said cooling system, sufficient of a liquid sequestering agent to form said cleaning agent into a dry pellet, and a substance for maintaining coolant in said cooling system at an alkaline pH.

13. The filter of claim 12 wherein said cleaning agent includes at least twenty percent by weight of said chelating agent and 10-25% by weight of said liquid sequestering agent, said sequestering agent being a liquid gluconate.

14. The filter of claim 13 wherein the cleaning agent includes more than one ounce of chelating agent.

15. The filter of claim 12 wherein said filter further contains dissolvable corrosion inhibiting agents chosen from the group consisting of alkali metal metasilicates, alkali metal nitrates, alkali metal nitrites, mercaptobenzothiazoles and tolyltriazole.

16. The filter of claim 15 wherein said cleaning agent and said corrosion inhibiting agents are formed into at least one pellet, said chelating agent comprising at least twenty percent by weight of the pellet.

17. A method for cleaning gel and corrosion products from a cooling system of an internal combustion engine and maintaining the cooling system in a protected state, the method comprising a first step of attaching into the cooling system a filter containing an alkaline cleaning and protective mixture including at least one ounce of chelant, a plurality of corrosion inhibiting agents, and means to maintain the cooling system at an alkaline pH, a step of operating the engine to disperse the cleaning agent throughout the cooling system to remove corrosion products and gel from the system, and thereafter a third step of replacing the filter with a second filter containing a plurality of corrosion inhibiting agents and means to maintain the cooling system at an alkaline pH, the second filter containing less than one ounce of chelant, the third step being carried out without draining the cooling system.

18. The method of claim 17 wherein the third step is carried out from one to five weeks after the first step.

19. The method of claim 17 wherein the mixture in the filter of the first step is in a dry, solid form having a composition and physical form to provide a dissolution period of at least ten minutes in the second step of the method.

20. The method of claim 17 wherein the mixture in the filter of the first step includes from twenty to forty percent by weight of an alkaline salt of ethylenediaminetetraacetic acid, and additionally includes a sequestering agent, the sequestering agent being dispersed throughout the cooling system with the cleaning agent.

* * * * *